Patented July 13, 1954

2,683,729

UNITED STATES PATENT OFFICE 2,683,729

MONO (METHYL AMIDE) SUBSTITUTED ORGANIC ISOCYANATES

Nelson V. Seeger, Cuyahoga Falls, and Thomas G. Mastin, Akron, Ohio, assignors, by mesne assignments, to The Goodyear Tire & Rubber Company, a corporation of Ohio No Drawing. Application November 1, 1950, Serial No. 193,517

9 Claims. (Cl. 260—453)

This invention relates to new compositions of matter and to a method for preparing the same. More particularly, it relates to the mono (methyl amide) substituted organic isocyanates resulting from the reaction of an organic polyisocyanate and a compound containing enolizable hydrogen and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters of polyesteramides such as those described in our co-pending applications Serial No. 170,055 and Serial No. 170,056, now abandoned. According to the present invention, a means is provided for controlling the reactivity of polyisocyanates.

The broad object of this invention is to provide a new class of chemical compounds from organic polyisocyanates and enolizable-hydrogen containing compounds. It is a particular object to provide a new class of chemical compounds some of which are useful as delayed action curing or cross-linking agents for diisocyanate-modified polyesters and polyesteramides. It is another object of this invention to provide as new compositions of matter the mono-adducts of polyisocyanates and enolizable-hydrogen containing compounds. A specific object is to prepare the mono-adducts of polyisocyanates and enolizable-hydrogen compounds in which the reactivity of the polyfunctional character of the polyisocyanate may be controlled.

A convenient method for the preparation of the new compounds to which this invention relates may be represented by the following equation:

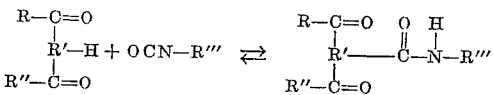

where

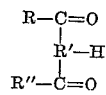

is a compound containing enolizable hydrogen in which R, R' and R'' are aliphatic radicals and R''' is an organic radical containing at least one —NCO group.

It will be noted that the reaction between the polyisocyanate and the enolizable-hydrogen containing compounds is a reversible reaction, the direction of which may be controlled by temperature. The mono-adduct of the polyisocyanate and the enolizable-hydrogen containing compounds is formed at relatively low temperatures while the formed mono-adduct dissociates into the polyisocyanate and the enolizable-hydrogen containing compound at relatively high temperatures in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2, diisocyanates; the aromatic compounds such as m-phenylene, p-phenylene, 4,4'-diphenyl, 1,5-naphthalene, and 1,4-naphthalene diisocyanates; the aliphatic aromatic compounds such as 4,4'-diphenylene methane, 2,4-tolylene, 4,4'-tolidine, and 1,4-xylylene diisocyanates; the nuclear substituted aromatic compounds such as dianisidene diisocyanate, 4,4'-diphenyl ether diisocyanate and chloro-diphenylene diisocyanate; the triisocyanates such as 4,4',4''-triisocyanto triphenyl methane, 1,3,5-triisocyanto benzene, and 2,4,6-triisocyanto toluene; and the tetraisocyanates such as 4,4'-dimethyl-diphenyl methane 2,2',-5,5'-tetraisocyanate.

Any enolizable-hydrogen containing compounds may be used in the preparation of the mono-adducts. Representative examples are aceto-acetic ester, diethyl malonate, ethyl n-butyl malonate, ethyl benzyl malonate, acetyl acetone and acetonyl acetone.

Certain preferred mono-adducts are those resulting from the reaction of the enolizable-hydrogen containing compounds and any one of the following:

1. 4,4'-diphenyl diisocyanate.
2. 2,4-tolylene diisocyanate.
3. 1,5-naphthalene diisocyanate.
4. Hexamethylene diisocyanate.

Specific mono-adducts which are preferred are those resulting from the reaction of:

1. Aceto-acetic ester and 4,4'-diphenyl diisocyanate.
2. Aceto-acetic ester and 2,4-tolylene diisocyanate.
3. Aceto-acetic ester and 1,5-naphthalene diisocyanate.
4. Aceto-acetic ester and hexamethylene diisocyanate.
5. Diethyl malonate and 4,4'-diphenyl diisocyanate.
6. Diethyl malonate and 2,4-tolylene diisocyanate.
7. Diethyl malonate and 1,5-naphthalene diisocyanate.
8. Diethyl malonate and hexamethylene diisocyanate.

In the preparation of the mono-adducts in general, the polyisocyanate and the enolizable-hydrogen containing compounds are usually dissolved in a suitable inert solvent such as toluene, methyl ethyl ketone, or o-dichlorobenzene. The solutions are stirred together and permitted to stand. The mono-adduct formed separates from the solution and is removed therefrom by filtering or evaporation of the solvent. The time required for the mono-adduct to form will vary from a few minutes to several hours depending upon the particular reactants used. A catalyst such as sodium methylate is preferably used. Usually an excess of the polyisocyanate is provided so that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of the mono-adducts is illustrated by the following examples which are to be interpreted as representative rather than restrictive of the scope of this invention.

Example 1

4,4'-diphenyl isocyanate (35.4 grams or 0.15 mol) and aceto-acetic ester (13.01 grams or 0.10 mol) were dissolved in 390 grams of toluene, to which 1 gram of freshly prepared sodium methylate was added. After 16 hours at reflux temperatures, the mono-adduct which had formed and separated from solution was filtered off.

Example 2

4,4'-diphenyl diisocyanate (35.4 grams or 0.15 mol) and diethyl malonate (16.02 grams or 0.10 mol) were dissolved in 390 grams of toluene, to which 1 gram of freshly prepared sodium methylate was added. After sixteen hours at reflux temperature, the mono-adduct which had formed and separated from solution, was filtered off.

While certain representative embodiments and details have been shown for the purpose of illustrating the invention, it will be apparent to those skilled in this art that various changes and modifications may be made therein without departing from the spirit or scope of the invention.

We claim:

1. As new compositions of matter the mono (methyl amide) substituted organic isocyanates corresponding to the formula $$\begin{array}{c} R-C=O \quad O \quad H \\ | \qquad \| \quad | \\ R'\text{---}C\text{---}N\text{---}R''' \\ | \\ R''-C=O \end{array}$$

in which R, R' and R'' are aliphatic radicals and R''' is an organic radical selected from the group consisting of aliphatic, cycloalkylene, aromatic and nuclear-substituted aromatic radicals which contain at least one isocyanate group.

2. The compositions of matter defined by claim 1 in which R''' is

—⟨  ⟩—⟨  ⟩—NCO

3. The compositions of matter defined by claim 1 in which R''' is

—⟨  ⟩—CH₃
     |
    NCO

4. The compositions of matter defined by claim 1 in which R''' is (naphthalene)—NCO 5. The compositions defined by claim 2 in which R and R'' are ($C_2H_5$)—O—.

6. The compositions defined by claim 2 in which R is $CH_3$— and R'' is ($C_2H_5$)—O—.

7. The compositions defined by claim 3 in which R and R'' are ($C_2H_5$)—O—.

8. The compositions defined by claim 3 in which R is $CH_3$— and R'' is ($C_2H_5$)—O—.

9. The method of making the mono (methyl amide) substituted organic isocyanates which comprises reacting approximately equal molecular amounts of an organic polyisocyanate and a compound containing enolizable hydrogen said reaction being carried out at a temperature below 100° C., said organic polyisocyanate being selected from the group consisting of aliphatic, cycloalkylene, aromatic and nuclear-substituted aromatic polyisocyanates.

References Cited in the file of this patent

UNITED STATES PATENTS

| Number | Name | Date |
|---|---|---|
| 2,320,704 | Petersen et al. | June 1, 1943 |

OTHER REFERENCES

F. I. A. T. Report No. 391 (Oct. 9, 1945), pages 1, 7, 8 and 9.

B. I. O. S., Final Report No. 719 (Received U. S. Patent Office March 12, 1948).

Bayer, Modern Plastics (June 1947), pages 149, 151, 152.